United States Patent [19]

Weir

[11] Patent Number: 5,745,559
[45] Date of Patent: Apr. 28, 1998

[54] RESTRICTED ACCESS TELEPHONES FOR LOGICAL TELEPHONE NETWORKS

[76] Inventor: Earline Madsen Weir, 1210 Second St., Manhattan Beach, Calif. 90266

[21] Appl. No.: 685,692

[22] Filed: Jul. 24, 1996

[51] Int. Cl.$^6$ .................................................. H04M 1/66
[52] U.S. Cl. .................... 379/199; 379/188; 379/219; 379/387; 455/410; 455/411
[58] Field of Search ........................... 379/188, 199, 379/196, 197, 198, 200, 201, 387, 207, 219; 455/410, 411

[56] References Cited

U.S. PATENT DOCUMENTS

| | | | |
|---|---|---|---|
| 4,601,011 | 7/1986 | Grynberg | 364/900 |
| 4,974,253 | 11/1990 | Hashimoto | 379/100 |
| 5,022,067 | 6/1991 | Hughes | 379/95 |
| 5,200,995 | 4/1993 | Gaukel et al. | 379/188 |
| 5,239,294 | 8/1993 | Flanders et al. | 455/411 |
| 5,241,595 | 8/1993 | Kuno | 380/18 |
| 5,337,345 | 8/1994 | Cassidy et al. | 455/410 |
| 5,386,468 | 1/1995 | Akiyama et al. | 455/410 |
| 5,448,760 | 9/1995 | Frederick | 455/410 |
| 5,452,346 | 9/1995 | Miyamoto | 379/188 |
| 5,455,863 | 10/1995 | Brown et al. | 455/410 |
| 5,613,215 | 3/1997 | Grube et al. | 455/411 |
| 5,625,869 | 4/1997 | Nagamatsu et al. | 455/411 |
| 5,642,401 | 6/1997 | Yahagi | 455/411 |
| 5,666,405 | 9/1997 | Weber | 379/196 |

*Primary Examiner*—Krista Zele
*Assistant Examiner*—Scott Wolinsky
*Attorney, Agent, or Firm*—Ronald M. Goldman

[57] ABSTRACT

A logical network is defined by a plurality of restricted class telephones in which such telephones incorporate a network access code characterizing the logical network. Each telephone contains a verification device that allows each telephone of such logical network to verify that others of such telephones are members of that logical network by transmission and receipt of a network access code. The logical network is useable on any telephone system, including public telephone service networks, cellular telephone systems and radio telephone systems. The verification device may be installed as a retroactive addition to the standard components found within existing cellular telephones or may be included as part of the technical design in new cellular telephones.

25 Claims, 7 Drawing Sheets

RESTRICTED ACCESS TELEPHONES FOR LOGICAL TELEPHONE NETWORKS

FIELD OF THE INVENTION

The invention provides closed or authenticated logical network access in digital telephone systems for a restricted class of telephones. The invention relates to telephone call restriction systems, and, more particularly, to a method and apparatus for superimposing a logical network of call restricted telephones onto an existing telephone system to restrict or limit individual telephones within that logical network from unlimited access to or from other telephones.

BACKGROUND

At present public telephone service networks, PTSN, and cellular telephone service allow a telephone subscriber unrestricted access to anyone else with a telephone. There are a few exceptions. As example, for a monthly fee, the subscriber's telephone central exchange will restrict access to "900" lines and specified area codes. Such restriction is accomplished by the central exchange telephone switch. The telephone switch recognizes the prefix or area code of the telephone numbers being dialed and blocks call completion upon recognition of a restricted pre-fix or area code. Since the call is blocked prior to completion and the subscriber avoids any charge or toll for a call. However, the telephone switch does not provide limited access for members of a particular affinity group or, as variously termed, a logical network, such as members of a county government or the military service.

As recent headlines have indicated, members of certain Government agencies (e.g. Los Angeles County, Calif. and the Israeli Army) were issued cellular telephones. The employees used those telephones, inappropriately, for personal business, at significant expense to the government agency. To end that abuse, the phones were necessarily withdrawn from employee use. That action was taken, in spite of the obvious benefit of having a portable cellular telephone available for Government business when the user is in the field.

A need exists thus to prevent a class of telephone users, particularly cellular telephone users, from completing calls to unauthorized parties. By a simple modification to a telephone, using equipment already available for digital telephony use, the present invention prevents mis-use of Government, corporation or other supplied telephones. Calls placed with telephones using the invention are restricted to designated purposes only, that is, to members of a logical network.

Accordingly, a principal object of the invention is to provide telephones with a bi-lateral verification procedure, one that allows both calling party and called party telephones to independently verify that the other telephone is a member of a prescribed affinity group or network and is authorized to complete the call.

A further object of the invention is to prevent placement of unauthorized telephone calls by persons who are authorized access to a telephone for the limited purpose of making calls only to prescribed network telephones.

A still additional object of the invention is to provide a means to permit a telephone to receive an indication that the other telephone to the connection is not a member of the logical network, yet permit the call to continue, an authentication of the other telephone.

An additional objective of the invention is to provide a logical network of telephones having limited access to out of network telephones and that may be used on the public telephone network, without interfering with operation of other non-logical network telephones on that public telephone network.

SUMMARY OF THE INVENTION

This invention, restricts access for members of a logical network or, in an alternate operating mode, provides call authentication for members of such logical network. That network may be a government agency, a corporation, or similar entity, or a set of users, who need verification or authentication when communicating.

For call restriction, telephone calls are restricted to members of the network. No conversation may take place unless both telephones are members of the network. In call authentication, the call is not inhibited. Instead, a warning is sent to the calling or called party, if one or the other is not a member of the network. The invention provides automatic assurance that the calling party and the called party are members of the same network and the call may proceed.

When a telephone connection is made between a restricted class telephones in the logical network, the called party telephone initiates a bi-lateral verification procedure. Each telephone verifies that the other telephone is a member of the restricted class and, thereby, is authorized to take part in the telephone call. The telephone connection is permitted to continue only if such verification is successful.

Thus, in accordance with the invention, a restricted class telephone is characterized by an inclusion of bilateral verification apparatus, specifically a network personal identification number verifier and a network personal identification number sender. A logical telephone network is, in turn, defined by a plurality of such telephones, minimally two.

Viewed in the most abstract sense, the invention is a digital sequence of numbers transmitted automatically. The sequence of numbers is a network access code. There is supporting logic built into the telephone. The network access code logic is used to identify the members of the logical network. The telephone transmits the network access code sequence automatically, at transmission speeds that preclude a user from manually entering the sequence from his dial pad. The sequence of numbers, as may be termed a network personal identification number or network PIN, is built into the telephone and may not be changed or modified by the individual user.

The sequence of network access operation is simple. The calling party goes off hook and dials a telephone number. As an additional feature to the invention, if that telephone number is recognized as a number that may be dialed without network access control, an excluded number, network access control is disabled and the call proceeds. Excluded numbers, normally are limited to emergency and home office numbers. They would not ordinarily include the user's home telephone number.

The called party receives the ring signal and goes off hook. Without any user intervention, a sequence of digits, representing the telephone's network access code, is transmitted automatically, by the called party telephone. This happens before the line is opened for conversation. The calling party telephone receives the sequence of digital numbers sent by the called party and stores the received code. The calling party telephone compares the code to one or more network codes to which the calling telephone is allowed access. If the code is recognized, then the calling party transmits a code back to the called party. If the code is not recognized or not received after a reasonable amount of time, the calling party's telephone goes on hook automatically. No conversation takes place. If, however, authentication is the only use of the network at the calling party telephone, a warning is given instead. A warning light may be turned on or a tone sounded to the ear or an extended silence occurs, any of which warns that the called party is not a member of the network. Either going on hook in the verification mode or providing an alarm in the authentication mode constitutes a perceptible indication to the user of the failure to validate a received code.

The restricted telephone's called party operation is similar. The called party waits for the handset to go off hook when a ring signal is detected. The called party telephone transmits the digital access code as stated above. Then the called party telephone waits for the calling party's access code. If the calling party access code is received, the called party stores the received calling party network access code. The called party telephone compares the received code to the network access codes to which the called party telephone has access. If the access code is not recognized or is not received after a reasonable amount of time, in verification mode the called party's telephone goes on hook automatically. No conversation takes place. If authentication is the only use of the network at the called party telephone, a warning is given that the calling party is not a member of the network with any of an audible tone or message. As before, either of the foregoing actions constitutes a perceptible indication for the user.

Preferably, the invention is implemented in the form of a programmed digital microcontroller chip that is integrated within the standard telephone circuitry, or, as a retroactive addition to a standard telephone, integrated to the standard telephone circuitry; and a replaceable memory chip for storage of at least the network access codes.

The foregoing and additional objects and advantages of the invention together with the structure characteristic thereof, which was only briefly summarized in the foregoing passages, becomes more apparent to those skilled in the art upon reading the detailed description of a preferred embodiment, which follows in this specification, taken together with the illustration thereof presented in the accompanying drawings.

DETAILED DESCRIPTION OF THE PREFERRED EMBODIMENTS

The public telephone network is a switched communications system. That is, one party, the calling party, selects the other party, the called party, with whom to communicate by dialing that party's telephone number. The telephone network recognizes that number and connects the circuits via a switch, to complete a telephone connection to the called party. The telephone number is sent by pressing the numbers on the telephone key pad or dial, or by selecting a key pad entry that represents a phone number that is held in a telephone's memory.

In addition to the familiar wireline telephones found in the home and office, cellular and wireless or radio communications systems also use person to person selection and are switched communications systems, differing from the wireline systems in details of technology, not material to the present invention. Thus when reference is made hereafter to telephone systems or telephone switching network, it is understood to include all such switched communications systems and not just the wireline system. However, the principal benefit of the invention at present, which is a financial benefit, occurs in those telephone systems that involve high tolls and, particularly those telephone services that charge tolls to both the calling party and the called party, which is the case in present cellular telephone systems. The preferred embodiment of the invention is therefor presented in a digital cellular telephone.

Figure 1:
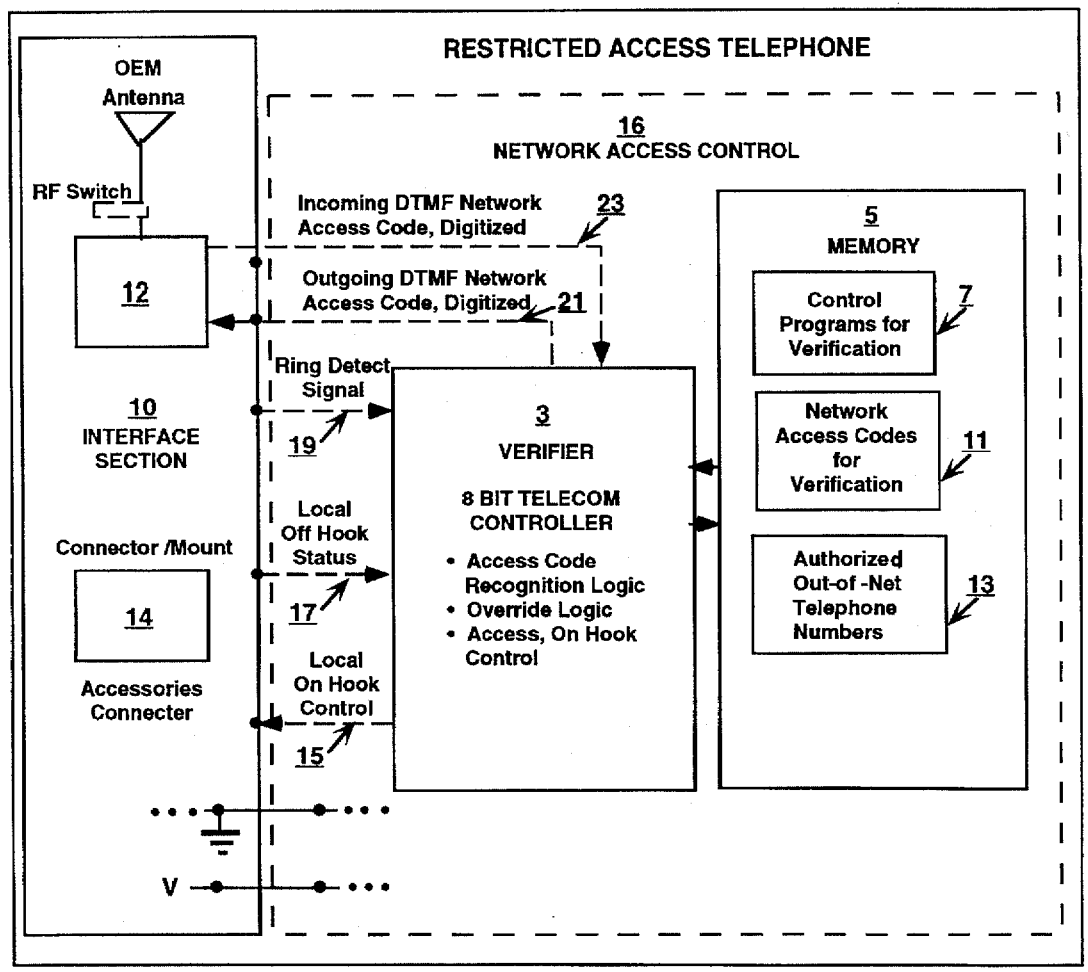
FIG. 1 is a block diagram of one embodiment of a restricted digital cellular telephone containing the verification apparatus according to the invention.

Reference is made to FIG. 1, which shows one embodiment of a digital cellular telephone constructed in accordance with the invention. Block 10 represents conventional telephone circuitry, found in present digital cellular telephones. That circuitry contains an RF section, Block 12, that transmits and receives RF transmissions; a connector and mount, Block 14; and includes a keypad, dialing peripherals, and a battery operated power supply, not illustrated in the figure. The standard digital telephone may also include telephone number memory, automatic dialing, automatic answering services and other features.

The foregoing structure is well known in telephony and need not be described in further detail. Telephones of the foregoing structure are referred to in other literature in a variety of ways, as example, as telephone sets, handsets, telephone stations, telephone instruments, cellphones, communicators and/or subscriber stations. It is understood that, irrespective of the terminology employed, the telephone devices are essentially the same: They enable two way communications to be selectively established by means of the public or private telephone switching network.

Block 16, bounded by dashed lines, shows the elements added by the invention that changes a standard digital cellular telephone into a restricted access telephone. The automatic logical network access is implemented in a programmed digital processor or Telecom Controller, Block 3. A Telecom controller is a low power microprocessor designed specifically for battery operation and telephone use. However, as becomes apparent, the invention is not dependent on the use of a Telecom controller. Any other digital microprocessor may also serve as the controlling apparatus. The logic for network access, described in greater detail hereafter, is located in an external read only memory, ROM, or erasable programmable read only memory, EPROM, memory or its equivalent, Block 5.

Memory 5 stores programs for controlling calling party and called party network access verification, 7, as described in greater detail hereafter.

Memory 5 also contains a data base or listing, as variously termed, containing authorized out-of-network phone numbers, 13, and network access codes, including the access code of at least one logical network to which the telephone is a member, the primary or principal one, and the access code of any other logical networks in which the telephone is given membership. Use of ROM or EPROM is preferred as such forms of memory prevent users from altering the characteristics of the telephone without specialized equipment.

The elements in block 16 serve to verify a telephone's network access code. In operation it sends a network access code to identify the telephone as a restricted access telephone and member of a logical network associated with the particular network access code sent.

Telecom controller 3 receives and sends digitized telephony signals from and to the standard circuitry 12 in the telephone. That includes various status and control signals, such as the idle or "on hook" control signal 15, the "off hook" status signal 17, "ring detect" signal 19, and the number sequences, such as outgoing digital number sequences 21, representing the network access codes, and incoming digital number sequences 23, also representing called party network access codes.

Except for the network access codes, the other signals are recognized as standard in the telephony arts and are used to allow the telephone to interact with the remote telephone switching network that supplies communication service to a subscriber's telephone. As those skilled in the art recognize, "off hook" describes the telephone's status when the telephone is not on standby or idle, as when a call is being placed or answered. In cellular telephones that on hook condition is generated by the standard circuitry when one operates the proper push button switch on the telephone's keypad to place or answer a call. In wireline telephones, it is generated by removing the handset from its cradle in the telephone base. "On hook" is the condition when the telephone is not being used; is idle. The onhook and off-hook signals are local signals between the telephone and the switch. The calling party and called party do not receive on-hook and off-hook signals from each other.

The ring signal is also a local signal between the public telephone network switch and the called party telephone. The telephone switching system sends a "ring" signal to an idle telephone, when another telephone is calling, causing the telephone to "ring". The ring detect is used by the standard circuitry to customarily alert the telephone user to the incoming call by activating an audible and/or visual signal or mechanical signal. Such ring detect circuits are disabled, once the user places the telephone off hook. The digital code outputs are used by the telephone to send the codes representing the numbers selected on the telephone keypad or dial, as variously termed, to the remote telephone switching network that, in turn, connects the telephone to the station dialed, the called party. It may be noted that in analog systems, DTMF tones, dual tone multifrequency tones, are used to send numbers and codes to the telephone switching network.

The foregoing signals have added function in the present invention. The on hook control signal 15 is used by the Telecom controller 3 to turn off power or reduce power to lower standby power levels to the elements in blocks 12 and 16 after a call is completed. It is also used in one embodiment of the invention to signal the telephone's standard circuitry 12, to go on hook, if the call is not verified, thereby forcing the disconnection of the call. It may be noted also that the on hook is, sometimes, used to initiate return of DC power to standby levels in the telephone's standard circuitry as well.

The off hook signal 17 is used to initiate network access code generation using DTMF tones in the telephone, when the telephone serves as the called party telephone. The off hook is also used to turn power on in the calling party telephone and initiate operation of the verification process, described in greater detail hereafter in connection with FIG. 3.

Ring detect is used by the telephone to determine that it is a called party. When the telephone is taken off hook to answer a call, the telephone uses the ring detect to determine that it is the called party and can then initiate operation of the appropriate verification process for a called party telephone, later herein described in connection with FIG. 4. The ring signal is generated by the local public telephone signal network, PTSN, switch. It is only available to a called party.

Outgoing digital codes or, in the case of the analog version of FIG. 7, later herein discussed, DTMF tones are used by both calling party and called party telephones to send their network access code number to one another. It may be noted that present PTSN equipment converts the digital codes to the DTMF form for control of the PTSN equipment, and, vice-versa, when it is sending to a digital cellular telephone. The network access code is stored as a series of digits in memory 5. A DTMF tone sequence is played through the telephone's speaker, or, if visual indicators are included in the telephone, by turning on a light as well, as a warning in those embodiments of the invention that are used only for authentication. That is, the tones deliver a warning to the user, but do not disconnect the telephone call as in other embodiments.

Incoming digital codes or DTMF tones are used by both parties to the telephone connection, called and calling party, to verify that the other party is a member of the logical network. The logical network access code is transmitted between both the calling and called party telephones using DTMF tones or their digital representation.

The capability to transmit all of the required signals is already provided in existing telephone equipment. No changes are required to handle those signals in telephones, PTSN switches or cellular telephone equipment, base station transceiver systems (BTS), base station controllers (BSC) or visited mobile switching centers (VMSC) to support the invention.

Figure 2:
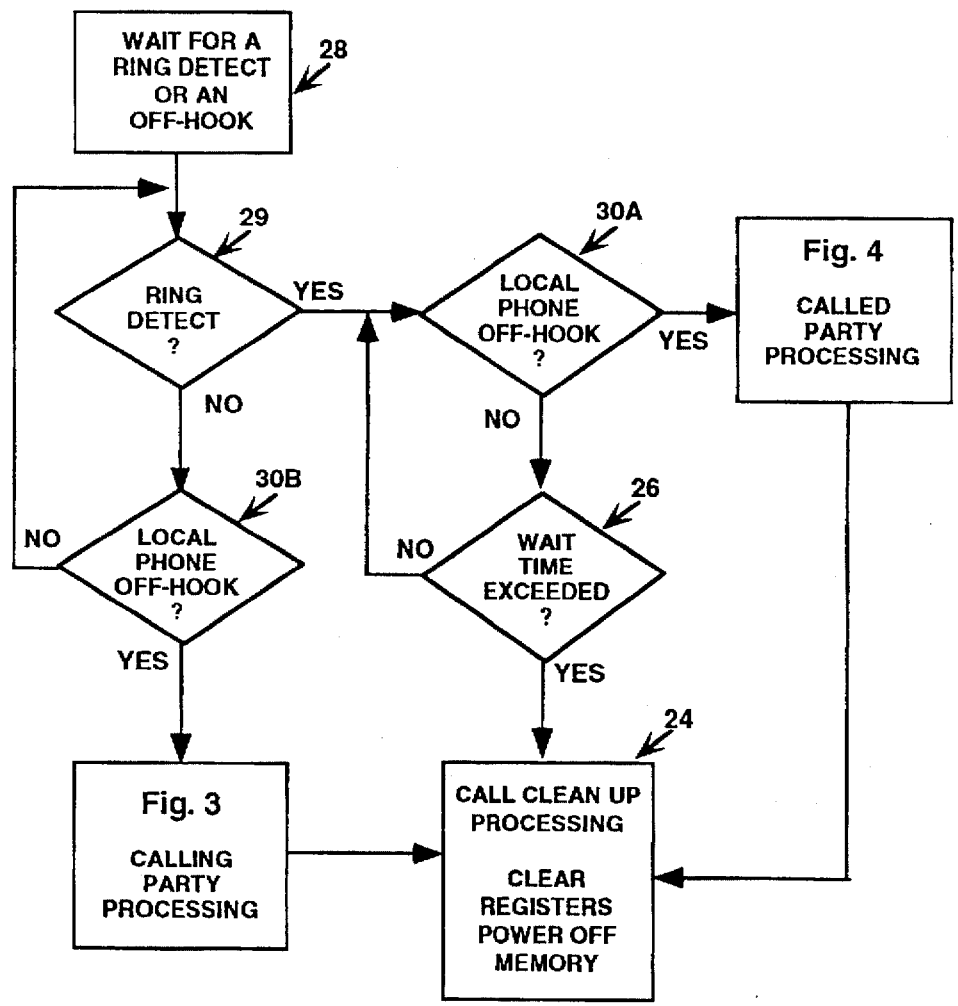
FIG. 2 is a flow chart describing the main processing loop for the digital microprocessor.

With the foregoing description of the components as background, the specific program, verification protocol, and procedure is next addressed. That is best described by the flow charts of FIGS. 2, 3 and 4, which are next considered. FIG. 2 shows how the signals described in FIG. 1 determine whether a user who takes his telephone off hook is a calling party or a called party. It illustrates the main processing loop. Initially the telephone is idle, as indicated at block 28. That is, nothing is happening, power to most circuit elements is turned off and the telecom controller waits for a ring detect, as at decisional block 29, or an off-hook, as at decisional block 30B. If a ring detect, as represented by a signal 19 in FIG. 1, is detected, 29, the circuit next checks for off-hook, as at decisional block 30A. When the user goes off hook, all telephone circuit elements are powered on, including those additional elements associated with the invention discussed later in FIG. 6.

Figure 4:
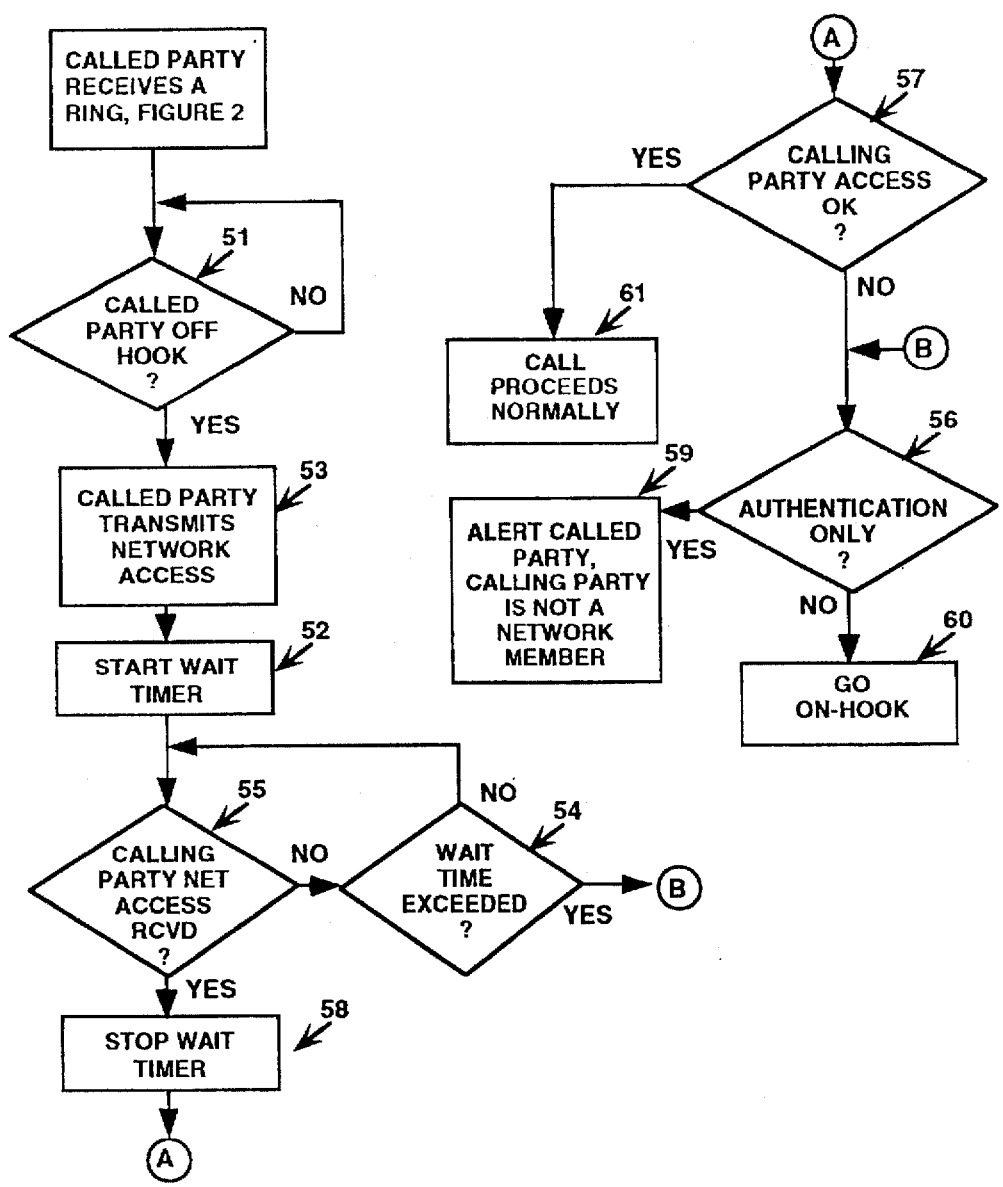
FIG. 4 is a flow chart describing the algorithm or steps in the operation of the verification apparatus when the telephone receives a call.

If the ring detect, 29, was present, as represented by the set of the ring detect register in the telecontroller's internal register's, the user is a called party and the process shifts or branches to called party processing represented in the flow chart of FIG. 4. If the user does not timely answer the telephone within the permitted wait period, as at decisional block 26, the procedure terminates, as represented by block 24; and the telecom controller reinitializes the program.

When a ring detect occurs, the telecontroller sets an internal register, noting the ring detect within an internal memory. As represented by block 24, that internal register is reset if the telephone is not timely answered, so the telecontroller can be ready or re-initialized for the next call. Further the power to the elements is turned off or placed on the lower standby power to reduce power consumption when the telephone is idle. That same re-initialization or "clean up" processing occurs also upon completion of the called party processing and calling party processing next described.

If the ring detect is not present when the user goes off hook, as at decisional block 30B, the user by definition can only be a calling party. The process then branches to that for calling party telephone processing represented in the flow chart of FIG. 3. The user is ready to dial another telephone.

Figure 3:
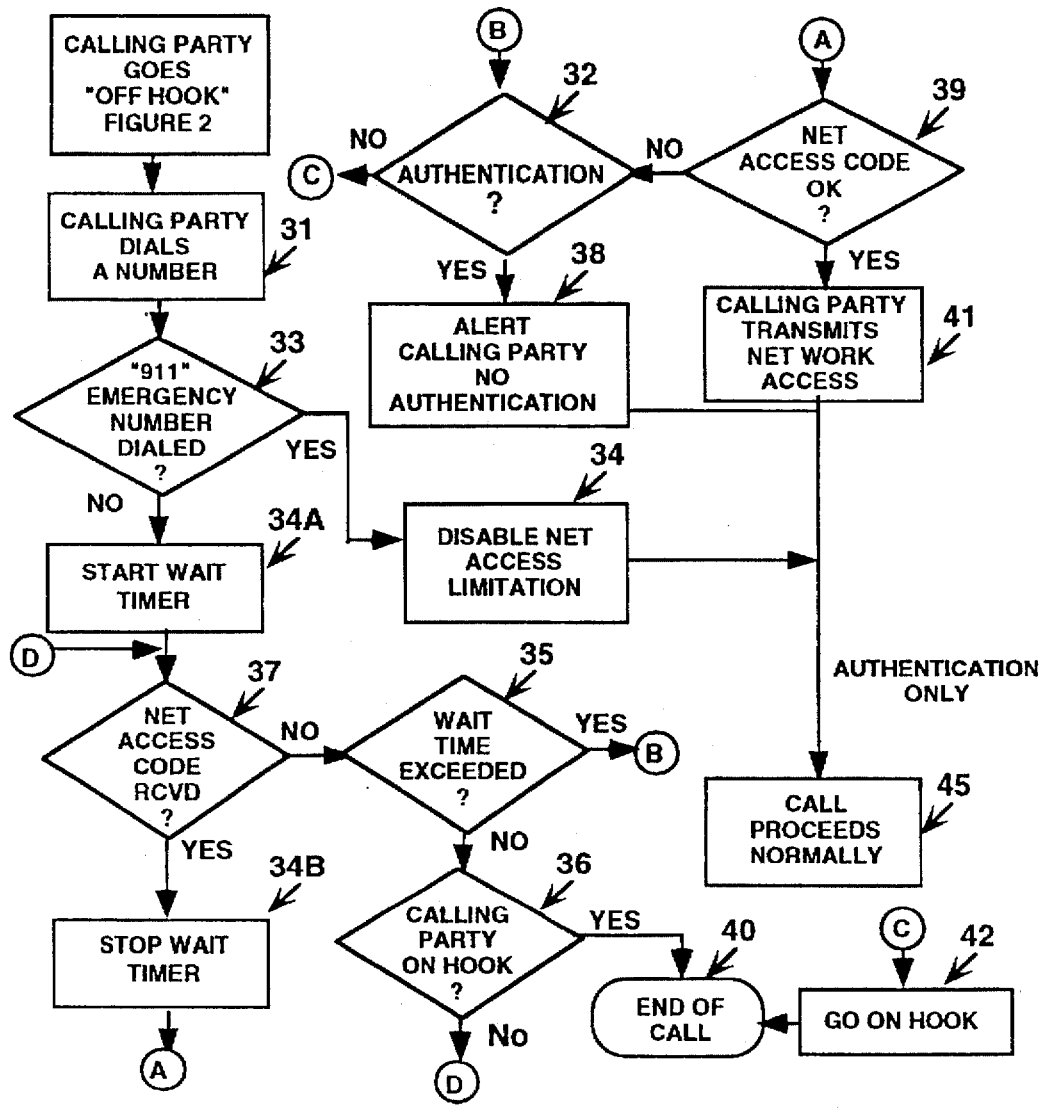
FIG. 3 is a flow chart describing the algorithm or steps in the operation of the verification apparatus when the telephone is used to place a call.

FIG. 3 illustrates the telecom controller processing flow for a calling party in both the authentication and verification operational modes. As represented in block 31, the calling party is off-hook and dials a number of another telephone. It may be noted that there is no dial tone employed in a cellular or radio system. Dial tones are signals to the ear to indicate in wireline telephone systems that a line is available either for dialing or because the other party has gone on-hook. They differ between systems. The telephone industry does not regard dial tone as a useful for automatic equipment and are omitted in cellular systems.

Dialing is accomplished by manual operation of the number buttons on the telephone's keypad that sends a number sequence of digital codes. In the case of an analog or wireline telephone these are DTMF tones. Dialing may also be accomplished by extracting a number from a telephone number memory, found in many modern telephones. From that memory the string of respective digital codes or DTMF tones, representing the dialed number, is sent automatically. If that dialed number is recognized as a restriction free number, "911" for example, as at decisional block 33, all network access logic is disabled, as at block 34, and the call proceeds in the manner of a normal telephone call, as at block 45.

To ascertain whether a restriction free number is being dialed, the telecom controller detects and stores the dialed number in temporary memory, and then quickly compares that number with the telephone numbers found in the list 13 of authorized out-of-network numbers, by pass numbers, maintained in EPROM memory 5, earlier illustrated in FIG. 1. If that determination is negative, the called number is therefore not a restriction free number. Once it is determined that the dialed number is not restriction free, the telecom controller starts a wait timer, suitably a conventional software clock, as indicated at block 34A. The wait timer clocks the time taken until a network access code is received, as at decisional block 37, from the called party telephone, in which event, the controller halts that timer, as indicated at block 34B. That measured time interval allows the controller to determine if the "wait time", typically a few seconds at most, has been exceeded.

The public telephone system's equipment is also functioning at this stage. Upon reception of the dialed number at the remote public telephone system, the telephone switching network decodes the numbers and establishes a communication circuit to the called party telephone represented by those numbers, and test the telephone to determine if the telephone is off hook. If not already off-hook, that is, busy, the telephone switching network then applies a ring signal to the called telephone. In wireline telephone systems, the PTSN network, generates and supplies a "ring back" signal to the calling party, an audio signal intended to let the calling party know that the telephone line has not gone dead and that action is being taken. That type of signal is not used in cellular telephone systems. Instead the indication is a short period of silence. If the called party never answers the telephone, after an extended silence, the calling party telephone eventually goes back on-hook, terminating the calling party processing as earlier described at 24 in FIG. 2, leaving the telephone ready for another use.

Continuing with FIG. 3, during its wait, the telecom controller repeatedly checks the status of the calling party's telephone, as at block 36, and checks for receipt of a network access code from the called party, as at block 37. If the called party telephone has not been taken off hook and sent its network access code, and the "wait" period, as at block 35, has not expired, the controller then checks to determine whether the calling party's telephone has been replaced on-hook 36. If the calling party's telephone remains off hook, indicating continued waiting, a negative determination is made and the program defers to the "wait time" sequence, previously described.

This called party network access detection loop continues during the predetermined time interval defining the "wait" period until either the calling party terminates the effort to complete the call, resulting in an affirmative determination at 36, or the called party answers, goes off-hook and sends its network access code, which is received at this calling party telephone, whereupon a positive determination results at block 37 and the wait timer is halted, 34B. The program then advances to check the received code's validity, represented at block 39.

Should, however, the calling party terminate the call before the foregoing action occurs and go on hook 36, the program proceeds to end the call as represented at block 40. In that case the program then branches back to block 24 in the main processing loop of FIG. 2., which results in reinitializing the telecom controller. Further, the telephone switching system detects the calling telephone's on-hook condition through the standard telephone circuit portion, and disconnects the telephone connection to the called telephone.

If the wait period 35 expires, the program proceeds to determine if the calling party telephone is operating in the authentication mode, block 32, and, if not, automatically causes the calling party telephone to go on hook, 42, and end the call, 40. If, however, the calling party telephone is operating in the authentication mode, an affirmative result is attained at block 32 and the calling party is alerted, as at block 38, with a warning light or tone played to the ear. However, the call proceeds normally, as at 45, in the latter operation mode, and the calling party, having been forewarned of the long delay, continues to wait.

The operation of a restricted access telephone of the kind being discussed, but which is serving as a called party telephone in the telephone connection is described in the flow chart of FIG. 4. A detailed discussion of that branch to the program is described later herein. It is sufficient for this stage of the description to note the interactivity between the calling telephone and the called party restricted access telephone; and that, in addition to going off hook, the called party's authorized telephone automatically transmits a network access code, an identification code, over the communication circuit established over the public network, whether PTSN, cellular or radio telephone network, to the calling party telephone, thereby representing itself as one of the restricted access telephones of some logical telephone network.

If the called party answers, the called party telephone returns an off-hook signal to the public telephone switching network. That network terminates the ring signal, and completes a telephone connection between the calling and called telephones, establishing a communications channel for two way communications there between.

Thus, upon answering a call, a called party restricted access telephone sends the network access code for its logical network. If that telephone is a member of more than one logical network, it transmits the access code of its primary or principal logical network. Preferably, the network access codes are stored in consecutive memory locations in a partitioned section of the memory and the principal network access code is preferably located in the first of those memory locations.

Briefly, if the called party telephone's access code is received, but is found invalid, or is not received, the calling party telephone in this embodiment, when operating in the authentication mode, automatically alerts the calling party that the called party does not have access or, when operating in the verification mode, sends an on-hook signal to the public telephone switching network, ending the call. The call does not proceed. If the called party network access code is received and tests valid, the calling party telephone in turn automatically transmits its network access code to the called party telephone.

Continuing with FIG. 3, effectively, the calling telephone automatically listens to the telephone communication channel for the network access code, represented at decisional block 37. If the network access code is not received within several seconds, in the verification mode the calling party's telephone automatically goes on hook, as at 42. That on hook status appears as an output at output 15 from telecom controller 3, illustrated in FIG. 1. The telephone returns to the idle condition, even though the calling party has not actually manually replaced his telephone on hook.

Upon receipt of a network access code, the telecom controller next verifies the received code's validity 39, checking to determine if the received network access code is listed in the calling party telephone's access code directory 11 stored in the "look up" memory. The telecom controller includes a DTMF recognizer that decodes the received code signal and processes that number, if the network access code is submitted in the DTMF form, which is used in wireline telephones. This permits not only digital cellular to digital cellular phone connections, but use in connections between digital cellular phone and wireline telephones as well.

The check of the received access codes is accomplished by a branch subroutine in the program, not illustrated. If that check fails to find the code in that directory, the determination at block 39 is negative. By definition, a negative decision at this block represents that the called party is not a member of the same logical telephone network as the calling party telephone. The program then branches to the operational step represented by block 32, which, as earlier described in connection with the discussion of "wait time", either effects a user alert or the disconnection of the telephone connection.

Upon verification of the called party telephone's network access code as valid, represented by an affirmative decision at block 39, the calling party's telephone in turn automatically transmits its network access code over the telephone channel to the called party, as represented at operational block 41. This is accomplished either by retaining a copy of the received access code in a specific location in temporary memory and resending the code from that memory location, or by marking the location of the particular access code in the code directory listing that was identical to the received code and sending a copy of the code at that marked memory location. Telecom controller 3 in FIG. 1 outputs that code at output 21. At this stage, the called party telephone is waiting, essentially listening, for the calling party's network access code.

If at any time, the called party telephone goes on-hook, the telephone connection is broken. As will later be discussed in connection with FIG. 4, that action occurs if the calling party's identification code cannot be validated for any reason, as determined at the called party telephone and the called party telephone is operating in the verification mode. In wireline telephone systems, the PTSN returns a dial tone alerting the calling party of the broken connection and/or allowing the calling party to dial another call. No dial tones are used in present cellular systems. The indication of a broken telephone connection is continuing silence, instead of the voice or data information that the caller expected.

Assuming that the called party telephone remains in the telephone connection, at this stage at the calling party telephone, the call proceeds normally and the respective verification and/or authentication processing concludes as represented at operational block 45. The parties may converse and/or send data over the established telephone communication channel and, ultimately, conclude the call. Concurrently, telecon controller 3, returning to the main processing loop of FIG. 1, reinitializes its registers. When one of the parties places their telephone on hook at the completion of the call, the regular telephone circuits 12 in the telephone detects that on hook and initiates generation of the signal to the public telephone system's central switch that results in release of the telephone channel by the telephone switching network.

FIG. 4 illustrates the telecom controller processing flow for a called party restricted access telephone. As earlier described in connection with FIG. 2, the called telephone stands idle and on hook. When called by another party, the called party receives a ring signal 29 from the telephone switching network. The telephone detects that ring signal and its standard circuits trigger an audible and/or visual signal, alerting persons near the telephone to answer the call. When the controller detects the telephone being taken off hook when the ring signal was present, it determines that the telephone is answering a call and, hence, is the called party, as indicated by the block so labeled in FIG. 2. The program branches to the operation represented by the flow chart of FIG. 4.

When the called party telephone goes off hook 51 to answer the call, the telecom controller immediately automatically transmits the network access code of which the telephone is a member, represented at 53. In the digital system being discussed this code is a digital sequence, such as binary code. In the analog cellular system and in wire line systems this is a sequence of DTMF tones. If the telephone is a member of only one logical network, the access code for that network is sent. If, however, the telephone is a member of a number of logical networks, the controller branches, not illustrated in the figure, to locate and send the access code of the primary or principal logical network in which the called restricted access telephone is a member. Specifically, referring back to the block diagram of FIG. 1, briefly, the telecom controller of the called telephone retrieves the assigned code from the listing maintained in EPROM 5 and outputs that code at output 21, to the cellular telephone's standard section, which transmits those codes over the telephone network to the calling telephone.

The called telephone then waits a reasonable period for reception of a network access code from the calling party telephone. It starts a wait timer 52 and loads that timer with a preset interval. Typically such timer is formed in the controller as by decrementing a number placed in memory and, using a software loop, periodically decrementing that number until zero is attained. A timing loop 54, 55 and 58 ensures that the access code is received within a predetermined time interval. Should the loop time out before an access code is received, the call is either terminated by issuance of an on-hook to the local PSTN switch, as at 60, if operating in the verification mode, which results in breaking the telephone connection, and/or, if operating in the authentication mode, an audible visual alert is given to the called party, as at 59, either of which serves as a perceptible indication to the user that the calling party is not a member of the logical auxiliary network.

The calling party access code is sent by the calling party telephone by the calling process described earlier in FIG. 3, not here repeated. In the called telephone, the program checks the received code against the network access code listing stored in the called telephone's EPROM memory 5, as represented at 57. If the code is found within the listing, the call proceeds normally, as indicated at 61. If the code is not found within the listing, a negative determination is produced. The program then checks to determine whether the called telephone is operating in the verification mode, at 56, and, if it is operating in that mode, as represented by operational block 59, the program then initiates an alert informing the called party that the calling party does not have access. If the called telephone is operating in the authentication mode, a negative determination is made at 56 and the program produces an on hook signal, at 60, to force the telephone exchange to break the telephone connection; whereby the call cannot be completed and conversation cannot take place.

Thus, if the network access code is not received, or, if received, is determined to be invalid, then the called restricted access telephone, in one embodiment of the invention, goes on hook, disconnecting the telephone call, or, in connection with an alternative authentication embodiment, issues an alert. The alert may be a warning tone via the called telephone's speaker or ancillary annunciator or a visual indicator. Either result serves as perceptible indications of the failure to validate the code, the one by the silence of the disconnection or, in wireline systems by the appearance of a dial tone; the other by an aural and/or visual indication. If the code is received and verifies as valid, the call proceeds normally as represented at block 61.

At this stage the called party verification branch of the program has served its function and halts. Concurrently, telecon controller 3 of the called telephone returns to the main processing loop of FIG. 2, reinitializes its registers. The operation of the called party telephone thereafter is governed by the telephones standard circuits. When one of the parties places their telephone on hook, the telephone exchange detects the onhook condition and releases the telephone channel between the two telephones.

The telecom controller, memory and ancillary elements -selected draw very low power and are suitable for battery powered operation. A typical Telecom controller for a practical embodiment of the invention is the PIC 17C42, manufactured by Microchip Technology Inc. The PIC 17C42chip draws only 95 micro amperes. A suitable EPROM also manufactured by Microchip Technology, Inc. is the 27LV256 EPROM. This EPROM is suitable for cellular telephone use, drawing, typically, eight milliamps for read operation and only one-hundred microamps for standby. That EPROM provides enough memory for the described functions. It also has sufficient space for additional data, as example, a telephone book of the members of the logical network as might be included in other embodiments of the invention.

To prevent a user from mimicking a restricted access telephone, the telecom controller program preferably contains a subroutine, not illustrated in the foregoing flow charts, that measures the interval between numbers sent by the called party telephone and issues a failure if that interpulse period is excessive. This occurs should a user attempt to enter the access code by hand through the keypad. The reception of the first number in a code sequence starts a timer, the next number received stops the timer and starts another timer. The controller then compares the time on the first timer to determine if that time exceeds the established interpulse interval, an interval stored in memory. If so, a perceptible termination signal is initiated. This process continues with the next received number acting to stop the second timer and initiating a third timer. The elapsed time on the second timer is compared to the established interpulse interval. If that time exceeds the maximum interpulse time, the controller again initiates the termination signal. This procedure continues for each pulse. Since it is almost physically impossible to manually enter the code numbers by the keyboard within those time intervals, the feature makes it extremely unlikely for one to defeat the system.

As those skilled in the art appreciate the foregoing operations are accomplished so long as DC power is supplied to controller 3 and memory 5. In less preferred embodiments of the invention, those elements may be supplied with DC power continuously, but that is not attractive for cellular phones as it results in more rapid drain of the battery. As noted in the foregoing description of operation, the preferred form of the invention supplies DC power only when it is needed. To assist with that a suitable hardware detection circuit is included to supply power to memory 5, which consumes the major portion of power required by the added verification circuits, only after receipt either of an on hook signal, as occurs when the telephone user desires to place a call or answer one, or receipt of a ring detect signal, whichever first occurs. That feature eliminates unnecessary drain on the battery when the telephone is idle.

Figure 6:
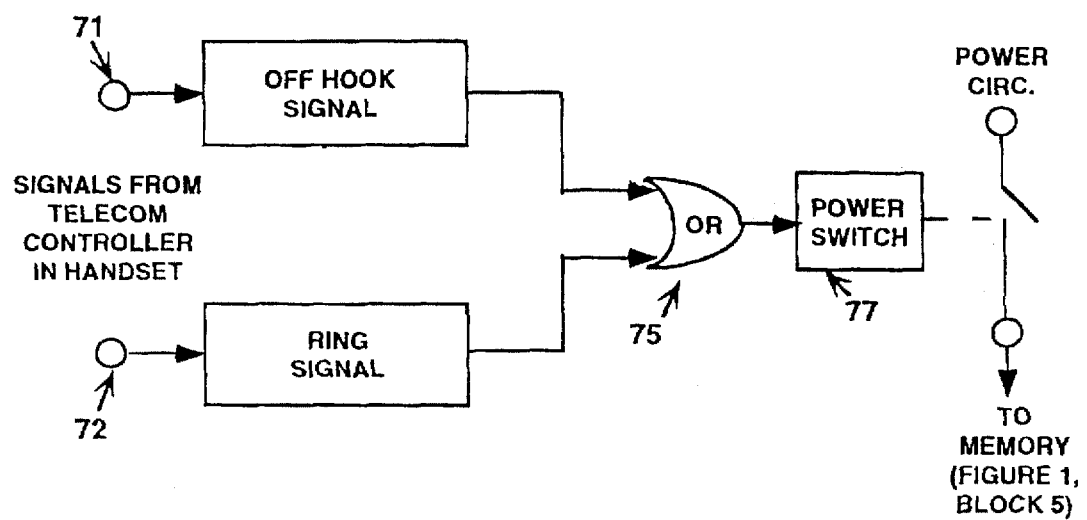
FIG. 6 is a logical circuit for coupling the cellular telephone power supply to the memory chip.

As illustrated in FIG. 6, an OR gate, 75, contains one input 71 to the off-hook detect circuit 17 from the telephone circuit of FIG. 1, in parallel with telecom controller 5 and another input 72 is connected to an output 73 of the telecom controller that provides a True output when a ring detect appears at the controllers input 19, also shown in FIG. 1. The OR gates output is connected to semiconductor power switch 77 that controls the DC power circuit to memory 5 as symbolically represented in the figure by an associated switch contact in series with the power circuit. When a True appears at either input of the OR gate, switch 77 operates and closes the power circuit to memory 5, which then supplies power to memory 5. A True output is maintained as long as the telephone remains off-hook, and even though the telecom controller has reset its ring detect register output 73 to False.

As earlier described, the preferred embodiment allows a restricted telephone to place calls to one or more out-of-network telephones, referred to as bypass telephones, such as those telephones one needs to reach for emergency services. Although preferred, such feature may easily be omitted in less preferred embodiments, should the proprietor of the logical network telephones wish to prevent any out of network calls whatsoever.

The foregoing telephones interconnect to and function on the public telephone service network, along with other conventional telephones having access to that network. The restricted class telephones and the bi-lateral verification procedure are essentially transparent to the public telephone service network. After a connection is made between two telephones, the telephone switching networks ignores further DTMF signals that are transmitted along the lines. That fact is easily verified by the number of telephone peripherals, such as telephone branch exchanges, that request the caller to press a selected dial keys for routing an incoming call. Those restricted class telephones, however, may establish successful telephone calls only with other restricted class telephones and/or the bypass telephones. In that sense, the use of the described restricted telephones essentially forms a separate network, a logical network defined by the access code, which is superimposed upon or overlies the public telephone network. Hence, two or more such restricted telephones of the structure herein described defines a logical network.

Figure 5:
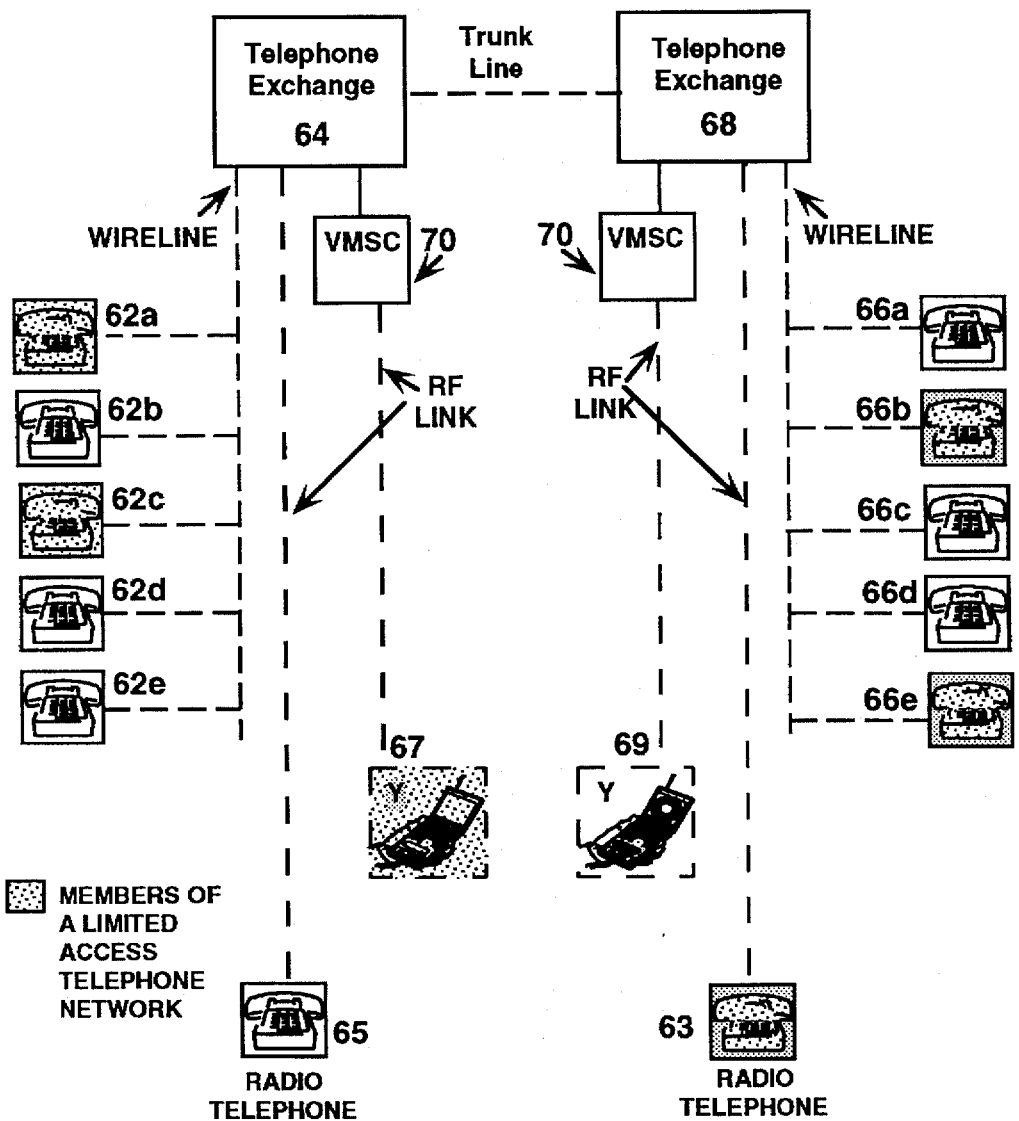
FIG. 5 is a representation of a public telephone network containing the logical telephone network of the invention.

The logical network is imposed on the PTSN without requiring any changes to the manner in which subscribers use the system. This relationship is shown in FIG. 5. Two central telephone exchanges (or switches), Blocks 64 and 68, are linked to a number of subscribers. These subscribers may range, for example from households, to corporations to specialized services like the 911 service. The subscribers may include members of a logical network (those blocks that are shaded), who are limited in their access, using the telephones equipped with the invention, which include wireline telephones 62a–62e and 66a–66e; radio telephones 63 and 65; and, via visited mobile switching centers (VMSC) 70, cellular telephones 67 and 69. Most telephone calls, even cellular ones eventually go through the PTSN and their wireline systems. Cellular telephone calls to cellular telephones in the same VMSC are the only calls that do not eventually go through a PTSN. The DTMF tones are also ignored by the elements of cellular systems after the call is placed. Cellular telephone exchanges must respond in the same way as the PTSNs in regards to signals that are transmitted after a connection has been made.

The foregoing has been generally described in connection with a single logical network. As those skilled in the art appreciate, additional logical networks, which are mutually exclusive of one another, may be defined and superimposed onto the telephone network in the same way as earlier described. Those networks maintain separateness by the access code listings for each, which are different from that in another such logical telephone network. As example, cellular telephone 67, shown shaded contain verification apparatus earlier described but which contains a network access code distinguishable from that of the first described logical network define another logical network. Thus the Army may have one such logical network, the Los Angeles County, another such network, and the local taxi cab company, still another. No one network may establish successful communications with any other logical network, and none of such logical networks interferes with the function of the other or with the standard telephones in the public network.

Figure 7:
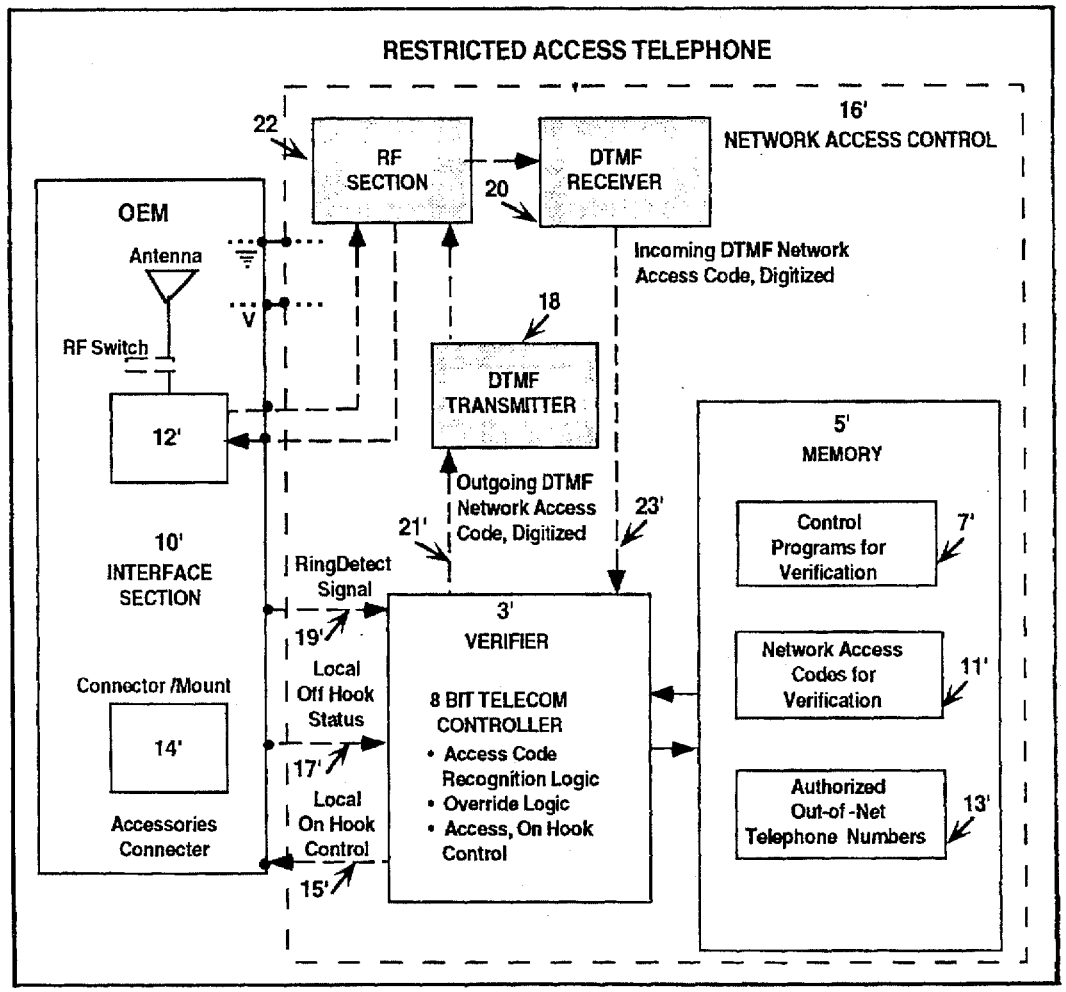
FIG. 7 is a block diagram of an analog embodiment of a restricted access wireline telephone containing the verification apparatus according to the invention.

An embodiment of the invention in wireline telephones or radio telephones that use actual DTMF tones, rather than digital representations, for placing calls is shown in FIG. 7. For convenience, the elements in this figure are identified by the same number used to identify the corresponding element where it appeared in the embodiment of FIG. 1, except that the number is primed. The invention contains all of the elements of FIG. 1 and has, in addition, a DTMF transmitter, 18, a DTMF receiver, 20, and an RF section, 22. The foregoing processing of FIGS. 2, 3, and 4 do not change when an analog type telephone is employed, instead of the digital type telephone. The incoming analog DTMF tones, are converted to digital representations, 23', by the DTMF receiver after they are processed by an RF section in the invention. Then they are processed the same way as in FIG. 2. The outgoing DTMF tones digital representations, 21', are converted to the analog DTMF signals, and then they are released to the wireline by the RF section.

From the foregoing description it is apparent that the foregoing features, and the included power source, is all that is necessary to incorporate the novel logical network program within a telephone, either initially upon the telephones manufacture and/or, retroactively, as an "add on" of separate components. Irrespective of the particular telephone system, the logical network program may be installed in each, either by the addition of the program to the existing microprocessor and/or by addition of a separate programmed microprocessor and the programmable memory containing the listing of authorized stations.

It is also possible to modify the foregoing structure to enable identification of individual telephones within a logical network. In such, one allocates another partition in memory with the individual codes for each network telephone. Processing is modified to transmit and verify both the network access code and the individual telephone. This is obviously more complex and requires greater memory resources and power. It is also more complex to maintain and less flexible. For that reason it is not preferred.

A programmed microprocessor, such as the telecom controller, establishes the series of means that completes each function required in the operation of the controlled device. The foregoing flow charts describe the operation carried out by the telecom controller 3, a programmed digital processor, in each restricted access telephone in the logical network. Those flow charts define the algorithms or steps that characterize and define the verification program. As those skilled in the art appreciate, the flow chart is a general description of the program, independent of programming language that is unique to a specified digital computer or processor. It may be used by a skilled programmer to tailor a suitable source code listing, including routines and subroutines, in language useable by the particular processor chip selected for the telephone, within a reasonably short time.

It is appreciated further that the programmed microprocessor installed in the telephone defines a bilateral verification device that allows each telephone in the two party telephone connection to verify the authorization of the other. Specifically the microprocessor includes a verification means to permit the telephone to check the identification code sent by the other telephone to the telephone connection against a code listing; a code sender for transmitting the telephone's network access code to the other telephone so that the other telephone may also verify the sending telephone as an authorized telephone; a party status detection means to determine whether the telephone is either the called party or the calling party; and means for first initiating the code identification means prior to the verification means, if the telephone is the called party, or first initiating the verification means prior to the code identification means, if the telephone is the calling party.

It is believed that the foregoing description of the preferred embodiments of the invention is sufficient in detail to enable one skilled in the art to make and use the invention. However, it is expressly understood that the detail of the elements presented for the foregoing purposes is not intended to limit the scope of the invention, in as much as equivalents to those elements and other modifications thereof, all of which come within the scope of the invention, will become apparent to those skilled in the art upon reading this specification. Thus the invention is to be broadly construed within the full scope of the appended claims.

What is claimed is:

1. A restricted access telephone for use in a switched communications network, said restricted access telephone containing a first network access code identifying said restricted access telephone as a member of a first auxiliary logical network containing a plurality of telephones similar to one another, comprising:

communications means for placing and answering telephone calls to establish a telephone connection with a second telephone over said switched communications network for permitting communication there between, said communications means including dialing means for dialing telephone numbers;

a network access code listing of network access codes of auxiliary logical networks to which said restricted access telephone is a member, including said first network access code;

call origination status monitoring means for monitoring whether said communications means places or answers a telephone call;

first verification means, responsive to said call origination status monitoring means determining that said communications means has placed a call, for automatically determining whether a second telephone with which a telephone connection is established contains a listed network access code contained in said network access code listing and for thereafter automatically sending said listed network access code to said second telephone when said automatic determination is positive; and second verification means, responsive to said call origination status monitoring means determining that said communications means has answered a call from a second telephone, for automatically sending said first network access code to said second telephone and for thereafter automatically determining whether said second telephone contains said first network access code; and perceptible indication means for providing a perceptible indication, responsive to either of said first and second verification means making a negative automatic determination.

2. The invention as defined in claim 1, wherein said perceptible indication means includes at least one of the following:

sensory warning means to indicate that said second telephone is not a member of the same auxiliary logical network as said restricted access telephone; and disconnection means for disconnecting said restricted access telephone from said second telephone to prevent further communication and thereby indicate that said second telephone is not a member of the same auxiliary logical network as said restricted access telephone.

3. The invention as defined in claim 2, wherein said sensory warning means comprises an audible message.

4. The invention as defined in claim 2, wherein said sensory warning means comprises a visual indication.

5. The invention as defined in claim 2 wherein an network access code comprises a multiple digit number; and wherein each of said first and second verification means send network access code numbers with a predetermined interdigital time spacing between each of the digits in said multiple digit number; and wherein each of said first and second verification means further includes: means for monitoring the interdigital time spacing between the numbers of a received network access code; and means for invalidating said received network access code when the interdigital time spacing monitored between any received numbers exceeds said predetermined interdigital time spacing.

6. The invention as defined in claim 2, further comprising:

bypass means for permitting said restricted access telephone to complete a call to selected out-of-auxiliary logical network telephones, said bypass means including means for disabling said first verification means, responsive to placement of a call to one of said selected out-of-auxiliary logical network telephones.

7. The invention as defined in claim 6, wherein said bypass means includes:

a number listing of out-of-auxiliary logical network telephone numbers for telephones with which uninhibited telephone communications are to be permitted;

bypass number monitoring means for monitoring the telephone number dialed by said dialing means and determining if said monitored telephone number is found within said out-of-auxiliary logical network telephone listing; and, means, responsive to a positive determination for said monitored telephone number, for disabling said first verification means.

8. The invention as defined in claim 2, wherein said switched communications network supplies a ring signal in response to receiving a telephone call placed to said restricted access telephone to indicate that another telephone has placed a call thereto; wherein said communications means of said restricted access telephone, responsive to answer of said telephone call, changes from an on-hook condition to an off-hook condition; and wherein said call origination status monitoring means includes:

means for determining whether said communications means of said restricted access telephone changed to said off hook condition (a) during the presence of a ring signal from said switched communications network, whereby said restricted access telephone is determined to be a called party telephone, or (b) during an absence of a ring signal, whereby said restricted access telephone is determined to be a calling party telephone.

9. The invention as defined in claim 2, wherein said first verification means includes:

first timing means for prescribing a first predetermined time interval for reception of a network access code transmitted by said second telephone;

checking means for checking any network access code received within said first predetermined time interval to determine whether such received access code is valid;

said checking means including:

means for storing said received network access code;

means for comparing said received access code against said access code listing to determine if said received access code is contained in said access code listing; and validate means for providing a valid result when said received network access code is contained in said listing, and an invalid result when said received network access code is not contained in said network access code listing;

means for automatically sending the same network access code to said second telephone when said received network access code checks as valid; and, alternatively, means for initiating said perceptible indication means to indicate failure to receive any network access code within said first predetermined time interval or to receive any network access code that checks valid.

10. The invention as defined in claim 9, wherein said second verification means includes:

means for automatically sending said first network access code;

second timing means for prescribing a second predetermined time interval following the sending of said first network access code within which to receive a network access code transmitted by a calling party telephone;

means for checking any network access code received within said second predetermined time interval to determine whether such received access code is valid;

said checking means including:

means for storing said received network access code;

means for comparing said received access code against said network access code listing;

means for providing a valid result when said received network access code is contained in said network access code listing, and an invalid result when said received network access code is not contained in said network access code listing; and means for initiating generation of a perceptible indication of the failure to receive any network access code within said second predetermined time interval or to receive any network access code that checks valid.

11. A restricted access telephone for use in a switched communications network, said restricted access telephone containing a first network access code identifying said restricted access telephone as a member of a first auxiliary logical network containing a plurality of telephones similar to one another, comprising:

communications means for initiating and receiving telephone calls to establish a telephone communication with a second telephone over said switched communications network;

said communications means comprising at least:

keypad means for sending telephone numbers to said switched communications network for dialing another telephone in said switched communications network;

transducer means for converting voiced words into electrical signals for transmission over said switched communications network;

speaker means for audibly reproducing voiced words from electrical signals representative thereof received over said switched communications network;

signaling means to provide indication that said telephone receiver is receiving a ring signal from said switched communications network when said telephone receiver is in an idle condition; and status transmitting means for indicating to said switched communications network when said restricted access telephone is on-hook and, thereby, in an idle condition and when said restricted access telephone is off-hook and, thereby, in use;

call origination status monitoring means for monitoring whether said communications means places a call, wherein said restricted access telephone is the calling party, or answers a telephone call, wherein said restricted access telephone is the called party;

said call origination status monitoring means including means for determining whether said restricted access telephone changed to said off hook condition (a) during the reception of a ring signal transmitted from said switched communications network, whereby said restricted access telephone is determined to be a called party telephone, or (b) in the absence of said ring signal, whereby said restricted access telephone is determined to be a calling party telephone;

a network access code listing of network access codes of auxiliary logical networks to which said restricted access telephone is a member, including said first network access code;

first verification means, responsive to said call origination status monitoring means determining that said communications means has placed a call, whereby said restricted access telephone is the calling party, for automatically determining whether a second telephone with which a telephone connection is established contains a listed access code and for thereafter automatically sending said listed access code to said second telephone when said automatic determination is positive;

said first verification means including;:

first timing means for prescribing a predetermined time interval for reception of a network access code transmitted by said called party telephone;

checking means for checking any received network access code to determine whether such received access code is valid; said checking means including: means for storing said received network access code; means for comparing said received access code against said network access code listing to determine if said received access code is contained in said network access code listing; and validate means for providing a valid result when said received network access code is contained in said network access code listing, and an invalid result when said received network access code is not contained in said network access code listing; means for automatically sending the same network access code to said called party telephone when said received network access code checks as valid; and, alternatively, indication initiating means for initiating a perceptible indication of the failure to receive within said predetermined time interval any network access code or any network access code that checks valid;

and second verification means, responsive to said call origination status monitoring means determining that said communications means has answered a call from a calling party second telephone, whereby said restricted access telephone is a called party, for automatically sending said first network access code to said called party second telephone and for thereafter automatically determining whether said calling party second telephone also contains said first network access code;

said second verification means including:

means for automatically sending said first network access code upon answer of a call;

timing means for prescribing a second predetermined time interval following the sending of said first network access code in which to receive a network access code transmitted by said calling party second telephone;

means for checking any received network access code to determine whether such received network access code is valid; said checking means including: means for storing said received network access code; means for comparing said received network access code against said network access code listing; and means for providing a valid result when said received network access code is found in said network access code listing, and an invalid result when said received network access code is not contained in said network access code listing; and indication initiating means for initiating generation of a perceptible indication of the failure to receive within said second predetermined time interval any network access code or to receive any network access code that checks valid;

perceptible indication generating means for providing a perceptible indication that the other telephone to said communication is not a member of said logical auxiliary network, responsive to said indication initiation means of each of said first and second verification means;

said perceptible generating means including at least one of the following perceptible indications:

sensory warning means to indicate that said second telephone to the telephone connection is not a member of the same logical auxiliary telephone network; and disconnection means for disconnecting said telephone connection to prevent further communication and thereby indicate that said second telephone to the telephone connection is not a member of the same logical auxiliary network;

bypass means for permitting said restricted access telephone to complete a call to selected out-of-logical auxiliary network telephones, said bypass means including means for disabling said first verification means responsive to placement of a call to one of said selected out-of-network telephones;

said bypass means including: a telephone number listing of out-of-logical network telephone numbers for telephones with which uninhibited telephone communications are to be permitted;

bypass number monitoring means for monitoring the telephone number dialed and determining if said monitored telephone number is found within said out-of-network telephone listing; and, means, responsive to a positive determination for said telephone number dialed, for disabling said first verification means.

12. The invention as defined in claim 11, wherein said restricted access telephone further includes: memory means, said memory means for storing said network access code listing and said telephone number listing of out-of-logical network telephone numbers of selected telephones with which uninhibited telephone communications are to be permitted.

13. The invention as defined in claim 11, wherein said network access code comprises a multiple digit number and wherein each of said first and second verification means sends said network code numbers as a serial stream of numbers with a predetermined interdigit time spacing between numbers in said serial stream; and wherein each of said first and second verification means further includes means for monitoring the interdigital time spacing between the numbers of a received network access code; and means for invalidating said received network access code when the interdigital time monitored between any received numbers exceeds said predetermined interdigit time spacing.

14. The invention as defined in claim 11, wherein said restricted access telephone further includes:
a DTMF signal generator; and
a DTMF signal decoder.

15. In combination with a first telephone, said telephone comprising communications means for initiating and receiving telephone calls to establish a telephone connection with another telephone over a switched communications network for permitting communication there between, said communications means including dialing means for dialing telephone numbers, a means for limiting access of said first telephone to other telephones, said access limiting means comprising:

memory means, said memory means containing a network access code of at least one auxiliary logical network to which said first telephone is a member; and digital microprocessor means, said digital microprocessor means including: a program;

call origination status monitoring means for monitoring whether said communications means places or answers a telephone call;

first verification means, responsive to said call origination status monitoring means determining that said communications means has placed a call, for automatically determining whether another telephone with which a telephone connection is established also contains said network access code and for thereafter automatically sending said network access code to said another telephone when said automatic determination is positive;

said first verification means including means for checking a network access code received from said other telephone against said network access code listing in said memory means;

second verification means, responsive to said call origination status monitoring means determining that said communications means has answered a call from another telephone, for automatically sending said network access code to said another telephone and for thereafter automatically determining whether said another telephone also contains said network access code;

said second verification means including means for retrieving and sending said network access code from said memory means and means for thereafter checking a network access code received from said another telephone against said network access code in said memory means; and perceptible indication generating means for providing a perceptible indication that said another telephone is not a member of said auxiliary logical network, responsive to either of said first and second verification means failure to determine that said another telephone contains said network access code.

16. For use in completing a telephone call between a calling party telephone and a called party telephone in a switched telephone network that is accessible to telephones that are members of the same auxiliary telephone network and comprise auxiliary network telephones and other telephones that are not members of such auxiliary telephone network, said calling and called party auxiliary network telephones each including a listing of network access codes identifying the auxiliary networks with which the respective telephone is a member and the principal one of such auxiliary networks, and a listing of telephone numbers of out-of-network telephones with which said auxiliary network telephones are permitted uninhibited communication, a method of automatically representing the lack of status of a called party telephone to a calling party auxiliary network telephone and of a calling party telephone to a called party auxiliary network telephone as members of the same auxiliary telephone network, and to a called party telephone as not a member of an out-of-auxiliary network telephone authorized for communication with the calling party auxiliary network telephone, said method comprising the steps at said calling party auxiliary network telephone of:

monitoring the change of state of an auxiliary network telephone from an idle condition to an off-hook condition to detect whether said auxiliary network telephone is placing or answering a call;

said monitoring including the steps of detecting whether a change of state to the off-hook condition occurs during reception of a ring signal transmitted from said switched telephone network, whereby said auxiliary network telephone represents a called party auxiliary network telephone, or occurs in the absence of said ring signal, whereby said auxiliary network telephone represents a calling party auxiliary network telephone;

dialing the telephone number of the called party telephone;

monitoring the telephone number dialed and determining if said telephone number is found within an out-of-network telephone listing; and, upon a positive determination, disabling the succeeding steps and permitting telephone communications over said telephone connection;

detecting answer by said called party telephone to establish a telephone connection between said telephones;

waiting a predetermined time interval following answer by said called party telephone for the reception of a network access code transmitted by said called party telephone;

checking any received network access code to determine whether such received access code is valid;

said checking including the steps of: storing said received network access code; comparing said received access code against a listing of network access codes maintained at said calling party telephone; and providing a valid result when said received network access code is contained in said listing, and an invalid result when said received network access code is not contained in said listing;

automatically sending the same network access code to said called party telephone when said received network access code checks as valid; and, alternatively, generating a perceptible indication of the failure to receive any network access code within said predetermined time interval or to receive any network access code that checks valid;

said method further comprising the steps at said called party auxiliary network telephone of:

monitoring the change of state of an auxiliary network telephone from an idle condition to an off-hook condition to detect whether said auxiliary network telephone is placing or answering a call;

said monitoring including the steps of detecting whether a change of state to the off-hook condition occurs during reception of a ring signal transmitted from said switched telephone network, whereby said auxiliary network telephone represents a called party auxiliary network telephone, or occurs in the absence of said ring signal, whereby said auxiliary network telephone represents a calling party auxiliary network telephone;

automatically sending a network access code of the principal auxiliary network with which said called party auxiliary network telephone is a member when said called party auxiliary network telephone changes to the off-hook condition and detects its representation as a called party telephone;

waiting a predetermined time interval following the sending of said network access code for reception of a network access code transmitted by a calling party telephone;

checking any received network access code to determine whether such received access code is valid;

said checking including the steps of: storing said received network access code; comparing said received access code against a listing of network access codes maintained at said calling party telephone; and providing a valid result when said received network access code is contained in said listing, and an invalid result when said received network access code is not contained in said listing;

generating a perceptible indication of the failure to receive any network access code within said predetermined time interval or to receive any network access code that checks valid.

17. The method as defined in claim 16 wherein said step of generating a perceptible indication of the failure to receive any network access code within said predetermined time interval or to receive any network access code that checks valid includes the step of;

preventing communication between said calling party telephone and said called party telephone; whereby telephone communications may not proceed.

18. The method as set forth in claim 17, wherein said step of preventing communication between said calling party telephone and said called party telephone includes at least one of the following steps:

disconnecting said telephone connection at said calling party telephone; and disconnecting said telephone connection at said called party telephone.

19. The method as defined in claim 16 wherein said step of generating a perceptible indication of the failure to receive any network access code within said predetermined time interval or to receive any network access code that checks valid includes the step of:

generating an audible warning that a telephone is not a member of the same auxiliary telephone network.

20. The method as defined in claim 16 wherein said step of generating a perceptible indication of the failure to receive any network access code within said predetermined time interval or to receive any network access code that checks valid includes the steps of:

generating an audible warning hat a telephone is not a member of the same auxiliary telephone network; and thereafter preventing communication between said calling party telephone and said called party telephone.

21. The method as set forth in claim 20, wherein said step of preventing communication between said calling party telephone and said called party telephone includes at least one of the following steps:

disconnecting said telephone connection at said calling party telephone; and disconnecting said telephone connection at said called party telephone.

22. For use in completing a telephone call between a calling party telephone and a called party telephone in a switched telephone network that is accessible to telephones that are members of the same auxiliary telephone network and comprise auxiliary network telephones and other telephones that are not members of such auxiliary telephone network, said calling and called party auxiliary network telephones each including a listing of network access codes identifying the auxiliary networks with which the respective telephone is a member and the principal one of such auxiliary networks, a method of automatically representing the lack of status of a called party telephone to a calling party auxiliary network telephone and of a calling party telephone to a called party auxiliary network telephone as members of the same auxiliary telephone network, and to a called party telephone as not a member of an out-of-auxiliary network telephone authorized for communication with the calling party auxiliary network telephone, said method comprising the steps at said calling party auxiliary network telephone of:

dialing the telephone number of the called party telephone;

detecting answer by said called party telephone to establish a telephone connection between said telephones;

waiting a predetermined time interval following answer by said called party telephone for the reception of a network access code transmitted by said called party telephone;

checking any received network access code to determine whether such received access code is valid;

automatically sending the same network access code to said called party telephone when said received network access code checks as valid; and, alternatively, generating a perceptible indication of the failure to receive any network access code within said predetermined time interval or to receive any network access code that checks valid.

23. The method as defined in claim 22, further comprising the steps at said called party auxiliary network telephone of:

automatically sending a network access code of the principal auxiliary network with which said called party auxiliary network telephone is a member when said called party auxiliary network telephone changes to a off-hook condition in response to reception of a call from a calling party telephone;

waiting a predetermined time interval following the sending of said network access code for reception of a network access code transmitted by said calling party telephone;

checking any received network access code to determine whether such received access code is valid; and generating a perceptible indication of the failure to receive any network access code within said predetermined time interval or to receive any network access code that checks valid.

24. The method as defined in claim 23 wherein said step at either of said calling party auxiliary network telephone and said called party auxiliary network telephone of generating a perceptible indication of the failure to receive any network access code within said predetermined time interval or to receive any network access code that checks valid includes the step of:

preventing communication between said calling party telephone and said called party telephone.

25. The method as defined in claim 23 wherein said step at either said calling party auxiliary network telephone and said called party auxiliary network telephone of generating a perceptible indication of the failure to receive any network access code within said predetermined time interval or to receive any network access code that checks valid includes the step of:

generating an audible warning that a telephone is not a member of the same auxiliary telephone network.

* * * * *